(12) United States Patent
Kuwayama

(10) Patent No.: US 6,996,038 B2
(45) Date of Patent: Feb. 7, 2006

(54) OPTICAL DISC APPARATUS

(75) Inventor: Yasunori Kuwayama, Daito (JP)

(73) Assignee: Funai Electric Co., Ltd., Daito (JP)

( * ) Notice: Subject to any disclaimer, the term of this patent is extended or adjusted under 35 U.S.C. 154(b) by 35 days.

(21) Appl. No.: 10/755,332

(22) Filed: Jan. 13, 2004

(65) Prior Publication Data

US 2004/0156277 A1 Aug. 12, 2004

(30) Foreign Application Priority Data

Jan. 14, 2003 (JP) .......................... 2003-006060

(51) Int. Cl.
*G11B 7/00* (2006.01)

(52) U.S. Cl. .................. 369/44.29; 369/44.41
(58) Field of Classification Search .............. 369/44.29, 369/44.34, 44.35, 44.41, 44.42, 44.27, 44.28, 369/124.1, 124.15
See application file for complete search history.

(56) References Cited

U.S. PATENT DOCUMENTS 5,416,759 A * 5/1995 Chun ...................... 369/44.36
5,610,883 A   3/1997 Yanagawa
6,606,284 B1 * 8/2003 Sakamoto et al. ....... 369/44.29

FOREIGN PATENT DOCUMENTS

| JP | 05-314522 | 11/1993 |
| JP | 6-111344  | 4/1994  |
| JP | 06-176371 | 6/1994  |
| JP | 2874663   | 3/1999  |

* cited by examiner

*Primary Examiner*—Nabil Hindi
(74) *Attorney, Agent, or Firm*—Crowell & Moring LLP

(57) ABSTRACT

In an optical disc apparatus for reading data from an optical disc, levels of photo-detecting signals outputted from a plurality of photo-detecting areas of a photo-detector are adjusted to be substantially even for canceling error components due to positioning error of the photo-detector on an optical pickup. Analogous signals outputted from the photo-detecting areas of the photo-detector are amplified by amplifiers and converted to digital signals by A/D converters. A processor takes the converted digital signals and adjusts gains of the amplifiers with using the digital signals.

9 Claims, 7 Drawing Sheets

TANGENTIAL DIRECTION OF TRACK

OPTICAL DISC APPARATUS

BACKGROUND OF THE INVENTION

1. Field of the Invention

The present invention relates to an optical disc apparatus for reading and reproducing data such as video data and audio data which are recorded on an optical disc such as a DVD (Digital Versatile Disc), and further relates to a method for adjusting levels of photo-detecting signals outputted from photo-detecting areas of a photo-detector used in the optical disc apparatus.

2. Description of the Related Art

In an optical disc apparatus, a laser beam is focused on a recording face of an optical disc such as a CD (Compact Disc), an LD (Laser Disc), a DVD, an MD (Mini Disc), and a reflected beam from the recording face is detected by a photo-detector provided on an optical pickup. The photo-detector converts photo-signals to electric signals, so that the data recorded on the optical disc can be read out and reproduced, electrically. The electric signals outputted from the photo-detector are further used for adjusting focusing of the laser beam on the recording face of the optical disc. The photo-detector used for a method utilizing astigmatism (hereinafter, called "astigmatic method") has partitioned four photo-detecting areas and outputs four photo-detecting signals respectively corresponding to the partitioned four photo-detection areas. A signal processor generates an RF signal, a focusing error signal and a tracking error signal with using the photo-detecting signals outputted from the photo-detector.

Since the photo-detector is mounted on the optical pickup by an automated machine, a position of the photo-detector includes a positioning error on the optical pickup. Thus, levels of the photo-detecting signals outputted from the photo-detecting areas of the photo-detector are occasionally not even due to the positioning error, although the laser beam is just focused on the recording face of the optical disc. Such a phenomenon is called "unbalance of the photo-detector". When the differences between the levels of the photo-detecting signals are larger than a predetermined error margin, the focusing error and the tracking error cannot be detected precisely. Thus, it is necessary to adjust the levels of the photo-detecting signals outputted from the photo-detecting areas of the photo-detector for compensating the positioning error.

For adjusting the levels of the photo-detecting signals outputted from the photo-detecting areas of the photo-detector to be even, signals such as the focusing error signal or the tracking error signal, which are generated by processing the photo-detecting signals, are conventionally used. It, however, is substantially impossible to adjust the levels of the photo-detecting signals precisely even, since the focusing error signal or the tracking error signal includes error component due to the unbalance of the photo-detector.

SUMMARY OF THE INVENTION

An object of the present invention is to provide an optical disc apparatus in which levels of photo-detecting signals outputted from photo-detecting areas of a photo-detector can precisely be adjusted even so that S/N of the photo-detecting signals is increased and data such as audio data and video data recorded on an optical disc can precisely be reproduced. Another object of the present invention is to provide a method for adjusting the levels of the photo-detecting signals which can be applied to the optical disc apparatus.

An optical disc apparatus in accordance with an aspect of the present invention comprises an optical pickup, a signal processor, a servo controller, a level adjuster, and a gain adjuster. The optical pickup having a light source for emitting a light beam to an optical disc and a photo-detector for receiving a reflected beam reflected by the optical disc so as to read data recorded on the optical disc. The photo-detector further has a plurality of partitioned photo-detecting areas. The signal processor generates a readout signal corresponding to the data recorded on the optical disc, a focusing error signal corresponding to discrepancy between a focal point of the light beam and a data recording face of the optical disc, and a tracking error signal corresponding to discrepancy between the focal point of the light beam and a track on the recording face of the optical disc with using the signals outputted from the photo-detector. The servo controller adjusts the focal point of the light beam corresponding to the focusing error signal and the tracking error signal. The level adjuster adjusts levels of photo-detecting signals outputted from the photo-detecting areas of the photo-detector, having a plurality of amplifiers for amplifying the photo-detecting signals. The gain adjuster adjusts gains of the amplifiers with using signals directly outputted from the level adjuster so as to adjust the levels of the photo-detecting signals substantially even.

By such a configuration, the levels of the photo-detecting signals are adjusted to be substantially even by adjusting the gains of the amplifier with using the signals directly outputted from the level adjuster. Thus, the error component of the photo-detecting signals due to positioning error of the photo-detector can be canceled. Since the photo-detection signals rarely include error component, the readout signal corresponding to the data recorded on the optical disc, the focusing error signal and the tracking error signal can be generate precisely. As a result, not only focusing servo control and tracking servo control of the light beam can be executed precisely, but also the data recorded on the optical disc can be reproduced precisely.

A method for adjusting levels of photo-detecting signals outputted from a plurality of photo-detecting areas of a photo-detector applied in an optical disc apparatus in accordance with an aspect of the present invention comprises the following steps. In a first step, a focusing servo mechanism of the optical disc apparatus is set to be open-loop state. In a second step, the focusing servo mechanism is driven for executing a focus searching operation under the open loop state during which a distance between an objective lens of an optical pickup of the optical disc apparatus and a recording face of an optical disc is varied. In a third step, digital signals corresponding to photo-detecting signals outputted from a plurality of photo-detecting areas of a photo-detector of the optical disc apparatus are taken while the focus searching operation is executed. In a fourth step, levels of the photo-detecting signals outputted from the photo-detecting areas of the photo-detector are adjusted with using the digital signals.

By applying such a method to an optical disc apparatus, the levels of the photo-detecting signals outputted from the photo-detecting areas of the photo-detector can be adjusted to be substantially even with using the digital signals corresponding to the photo-detecting signals themselves. As a result, error components included in the photo-detecting signals due to positioning error of the photo-detector on the optical pickup can be canceled.

DETAILED DESCRIPTION OF THE EMBODIMENT

An embodiment of the present invention is described with reference to the drawings.

Figure 1:
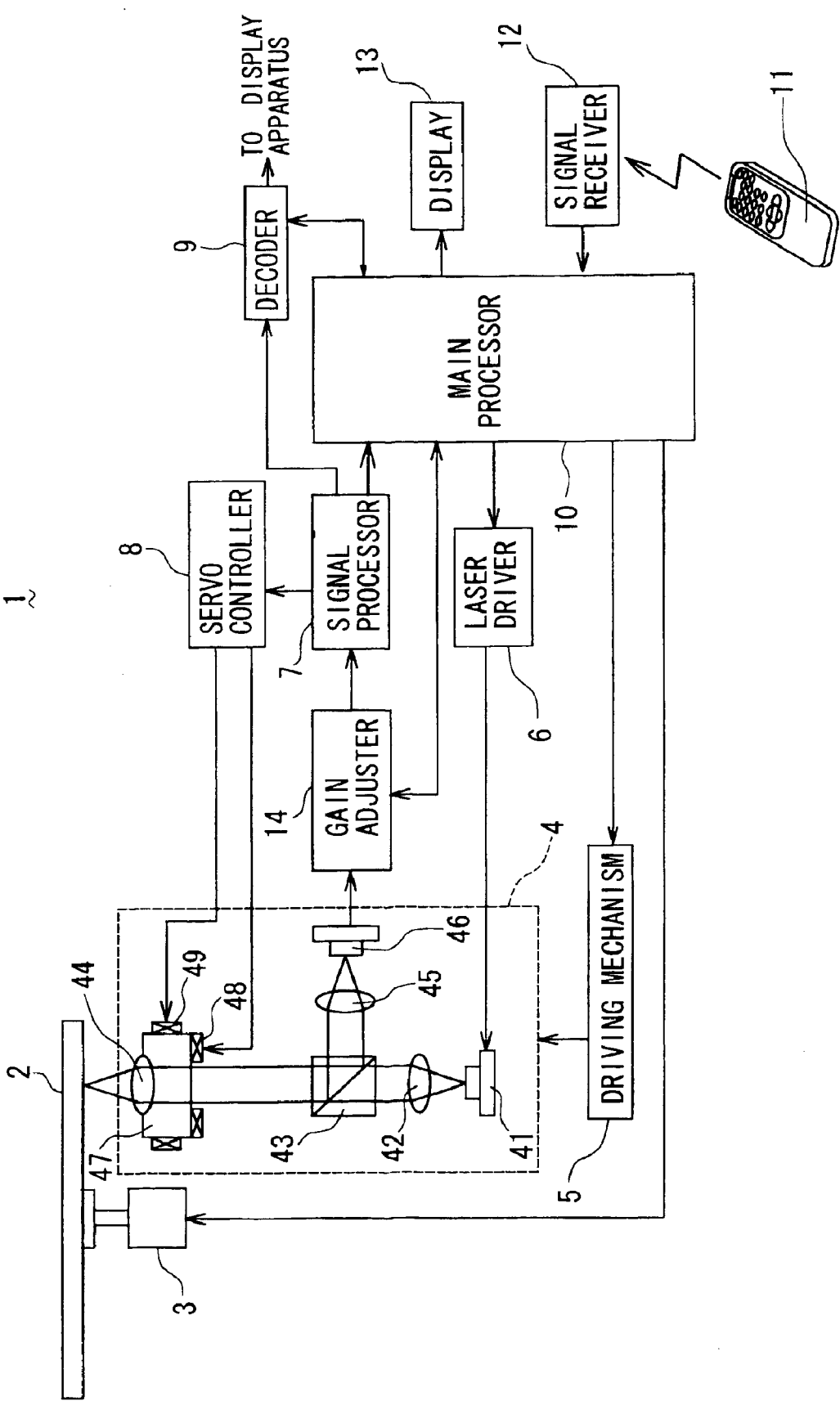
FIG. 1 is a block diagram for showing a configuration of an optical disc apparatus in accordance with an embodiment of the present invention.

FIG. 1 shows a block diagram of an optical disc apparatus 1 in accordance with this embodiment. The optical disc apparatus 1 reads compressed data of audio data, video data and so on from an optical disc 2 such as DVD, and reproduces video picture, sound and so on with using the read compressed data. In the optical disc apparatus 1, a focusing error signal is generated by the astigmatic method.

The optical disc apparatus 1 comprises a spindle motor 3 for rotating the optical disc 2, an optical pickup 4 for outputting the data recorded on the optical disc 2 as RF signal format, a driving mechanism 5 for moving the optical disc 4 in a radial direction of the optical disc 2.

The optical pickup 4 further comprises a laser diode 41 for emitting a laser beam, a collimator lens 42 for expanding the laser beam as a parallel beam, a beam splitter 43 for passing through the laser beam and for reflecting a reflected beam from the optical disc 2 substantially at right angle, an objective lens 43 for focusing the laser beam on a recording face of the optical disc 2, a condenser lens 45 which is, for example, a cylindrical lens for generating astigmatism with respect to the reflected beam, and a photo-detector 46 for detecting a state of the reflected beam.

The optical disc apparatus 1 further comprises control units of a laser driver 6 for controlling the laser diode 41, a level adjuster 14 for adjusting gains of gain adjusting amplifiers 21 (see FIG. 2) so as to adjust levels of four photo-detecting signals outputted from photo-detecting areas 51a to 51d of a main photo-detecting unit 51 (see FIG. 3) of the photo-detector 46, a signal processor 7 for generating several kinds of signals with using the photo-detecting signals outputted from the photo-detector 46, a servo controller 8 for controlling the position of the objective lens 44, a decoder 9 for generating audio signals and video signals by executing decoding process to compressed data outputted from the signal processor 7, and a main processor 10 for controlling the optical disc apparatus 1, wholly. A signal receiver 12 for receiving signals transmitted from a remote controller 11 and a display 13 for displaying several kinds of messages are connected to the main processor 10. The remote controller 11 is used by a user for instructing start and stop of reproduction of the data and for setting conditions of the optical disc apparatus 1.

The objective lens 44 is held on a lens holder 47. A focusing coil 48 is provided in the vicinity of the lens holder 47 for moving the lens holder 47 with the objective lens 44 in a direction parallel to an optical axis of the objective lens 44 by electromagnetic action. Similarly, a tracking coil 49 is provided in the vicinity of the lens holder 47 for moving the lens holder 47 with the objective lens 44 in a direction parallel to the radial direction of the optical disc 2 by electromagnetic action. The focusing coil 48 and the tracking coil 49 are respectively controlled by the servo controller 8 for adjusting the position of the objective lens 44 held on the lens holder 47.

The signal processor 7 generates an RF signal corresponding to the data recorded on the optical disc 2, a focusing error signal and a tracking error signal with using the photo-detecting signals outputted from the photo-detector 46. The focusing error signal corresponds to a quantity of discrepancy between a focused point of the laser beam and the recording face of the optical disc 2 in the direction of the optical axis of the optical lens 44. The tracking error signal corresponds to a quantity of discrepancy between the focused point of the laser beam and a track on the recording face of the optical disc 2 in the radial direction of the optical disc 2.

The servo controller 8 controls to supply electric currents to the focusing coil 48 and the tracking coil 49 for adjusting the position of the objective lens 44 responding to the focusing error signal and the tracking error signal so that the laser beam emitted from the laser diode 41 is just focused on a track on the recording face of the optical disc 2.

Figure 2:
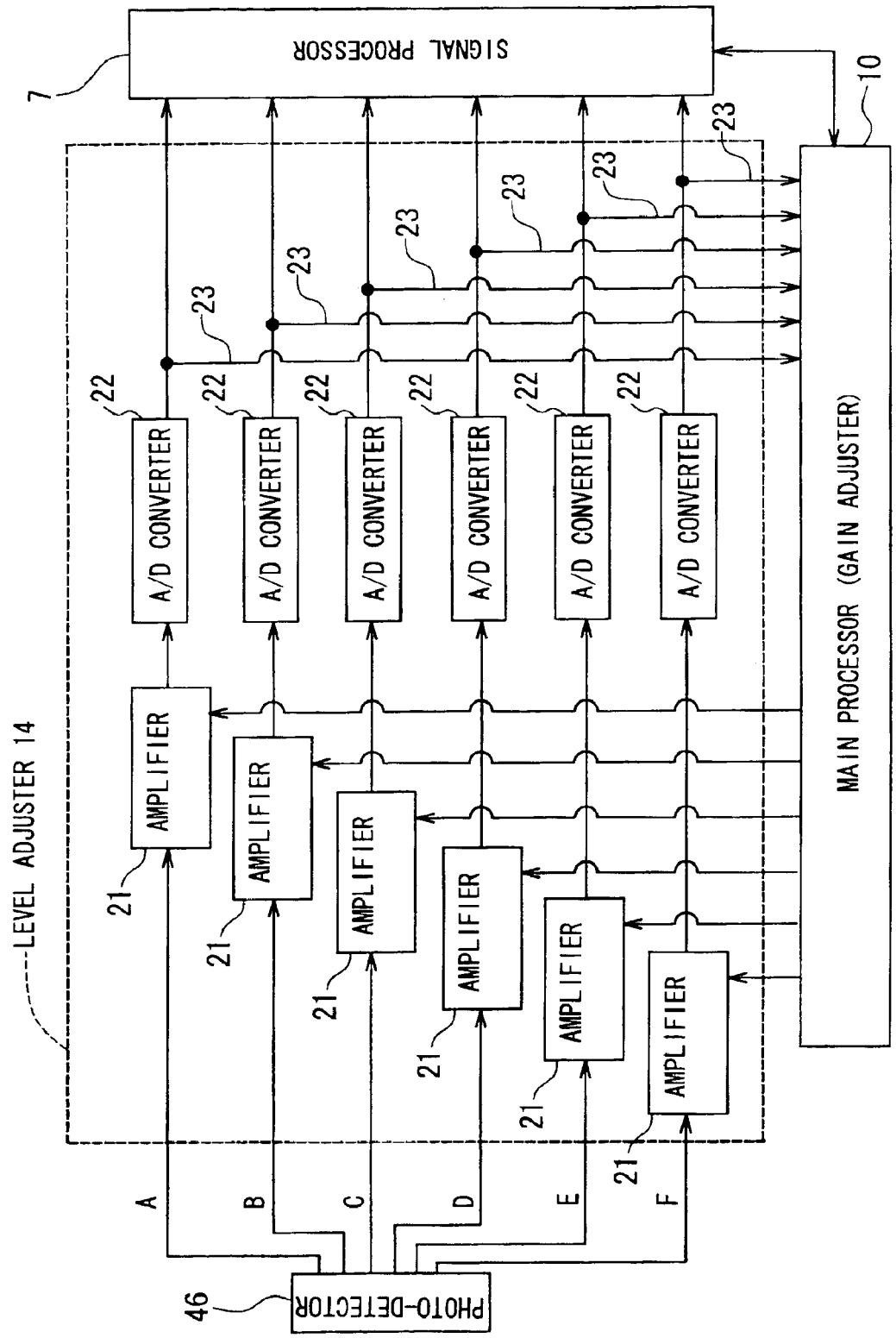
FIG. 2 is a block diagram for showing a configuration of a gain controller in the optical disc apparatus.

A detailed configuration of the level adjuster 14 is shown in FIG. 2. The level adjuster 14 comprises six gain adjusting amplifiers 21 for adjusting levels of photo-detecting signals "A" to "F" outputted from respective photo-detecting areas of the photo-detector 46, six A/D converters 22 for converting analogous signals outputted from the gain adjusting amplifiers 21 to digital signals, and six wirings 23 for inputting the digital signals from the A/D converters 22 into the main processor 10 which serves as a gain adjuster.

The main processor 10 controls the gain adjusting amplifiers 21 corresponding to the digital signals outputted from the A/D converters 22 in a manner so that the levels of the analogous signals outputted from the gain adjusting amplifiers 21 become even. By such a configuration, it is possible to adjust the levels of the photo-detecting signals outputted from the photo-detecting areas 51a to 51d and 51e and 51f of the photo-detector 46 respectively substantially even by directly using the photo-detecting signals themselves. As a result, the levels of the photo-detecting signals outputted from respective photo-detecting areas of the photo-detector 46 can precisely be adjusted. Furthermore, the signal processor 7 can precisely generate the RF signal, the focusing error signal and the tracking error signal with using the adjusted photo-detecting signals, so that the servo controller 8 can execute the focusing servo control and the tracking servo control precisely with using the precise focusing error signal and precise tracking error signal outputted from the signal processor 7. Still furthermore, the decoder 9 can decode the precise RF signal, so that the video image and the sound can precisely reproduced on a display apparatus.

Figure 3:
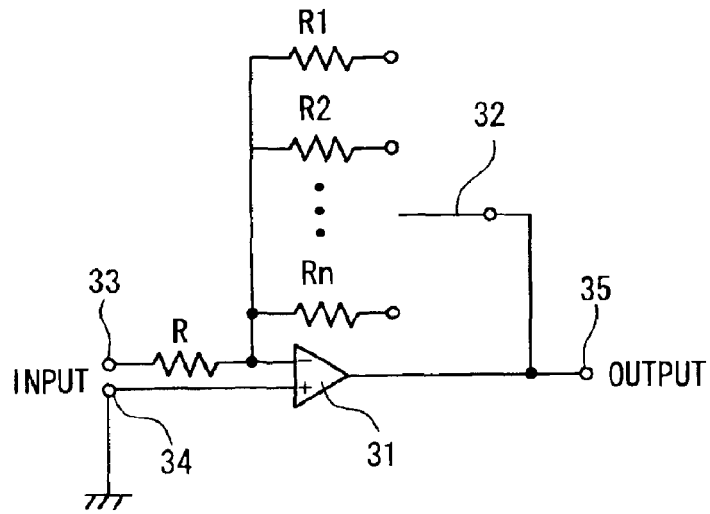
FIG. 3 is a circuit diagram for showing a configuration of a gain adjusting amplifier in the gain controller.

An example of circuit diagram of the gain adjusting amplifier 21 is shown in FIG. 3. The gain adjusting amplifier 21 has a first input terminal 33 through which the photo-detecting signal outputted from each photo-detecting area of the photo-detector 46 is inputted, a second input terminal 34 which id grounded, a resistor "R", an operational amplifier 31, resistors R1 to Rn, a switch 32 and an output terminal 35. In such a configuration, the level of the gain outputted from the output terminal 35 can be switched n-stages of R1/R to Rn/R by selecting one among the resistors R1 to Rn via the switch 32.

Figure 4:
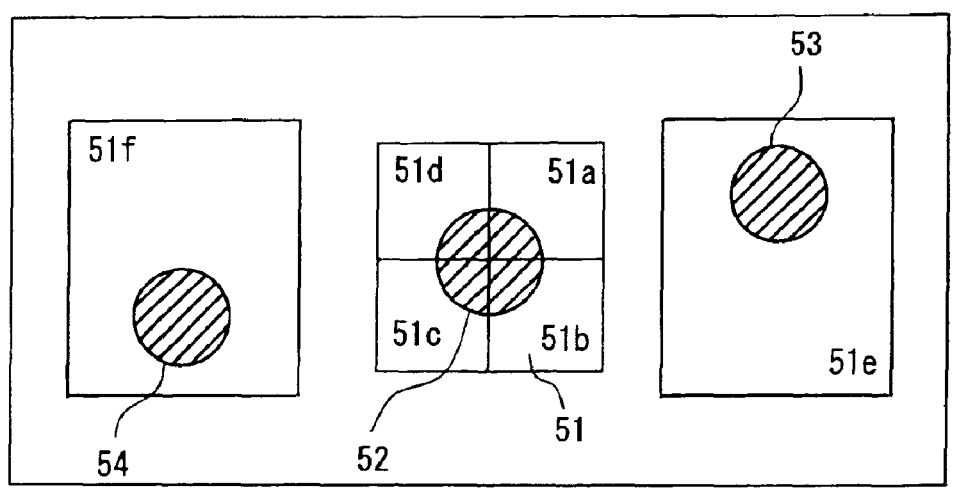
FIG. 4 is a plan view for showing an arrangement of photo-detecting areas of a photo-detector used in the optical disc apparatus.

Subsequently, an arrangement of the photo-detecting areas of the photo-detector 46 is shown in FIG. 4. The photo-detector 46 has six photo-detecting areas 51a to 51f. The photo-detecting areas 51a to 51d, which are closely arranged as 2×2 matrix at center portion of the photo-detecting face of the photo-detector 46, constitute the main photo-detecting unit 51. The photo-detecting areas 51e and 51f are respectively positioned at both side portions of the main photo-detecting unit 51 on the photo-detecting face of the photo-detector 46 in a tangential direction of a track on the recording face of the optical disc 2. The main photo-detecting unit 51 receives the main beam 52, and the photo-detecting areas 51a to 51d respectively output the photo-detecting signals "A" to "D" in FIG. 2. The photo-detecting areas 51e and 51f respectively receive sub-beams 53 and 54, and output the photo-detection signals E and F in FIG. 2. The photo-detection signals "E" and "F" are used for generating the tracking error signals.

The level adjusting process of the photo-detecting signals outputted from the photo-detecting areas 51a to 51d of the photo-detector 46, when a focus searching operation is executed under fixing the focusing servo system in open-loop state, is described with reference to a flow chart shown in FIG. 5. In the open-loop state, the focusing servo system is not fed back.

At first, the main processor 10 sets the focusing servo system in the open-loop state, and outputs a institution signal to the servo controller 8 for starting a focus searching operation. The servo controller 8 starts the focus searching operation with varying a distance between the objective lens 44 and the recording face of the optical disc 2 (S1). When the main processor 10 senses that the servo controller 8 starts the focus searching operation, it transmits the photo-detection signals "A" to "F" outputted from the photo-detecting areas 51a to 51f of the photo-detector 46 to the signal processor 7. The signal processor 7 generates the focusing error signal with using the photo-detection signals "A" to "D" by the astigmatic method. When the photo-detection signals "A" to "D" outputted from the photo-detector 46 satisfy a relation of (Ao+Co)=(Bo+Do), a level of the focusing error signal becomes "0", hereupon the symbols Ao, Co, Bo, and Do respectively designate output values of the photo-detection signals "A" to "D".

When the level of the focusing error signal becomes "0" (YES in S2), the main processor 10 takes the photo-detecting signals "A" to "F" outputted from the photo-detecting areas 51a to 51f of the photo-detector 46 through the wirings 23 (S3). The main processor 10 serving as the gain adjuster adjusts the gains of the gain adjusting amplifiers 21 in a manner so that all the levels of the photo-detecting signals "A" to "F" become substantially even in a desired region (S4).

Figure 6:
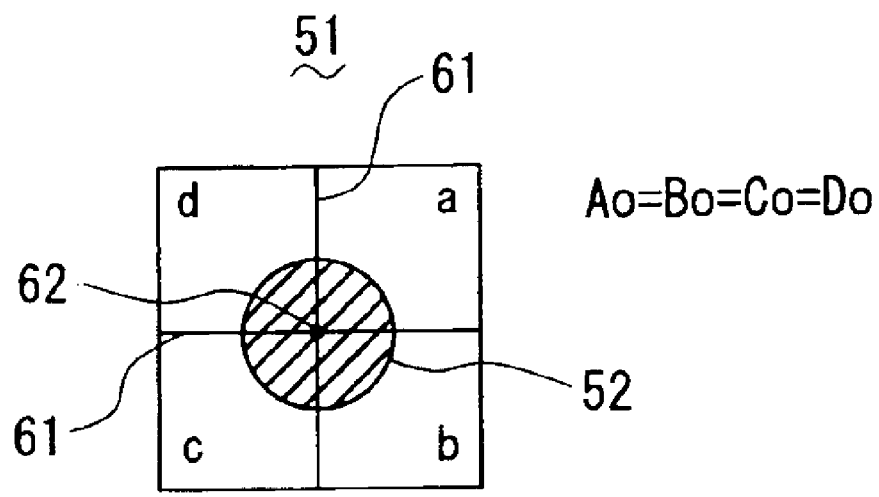
FIG. 6 is a plan view for showing a position of a main beam on four photo-detecting areas when a relation Ao=Bo=Co=Do is satisfied with respect to output values Ao, Bo, Co and Do of photo-detecting signals "A" to "D" outputted from the photo-detecting areas of the photo-detector.
Figure 7:
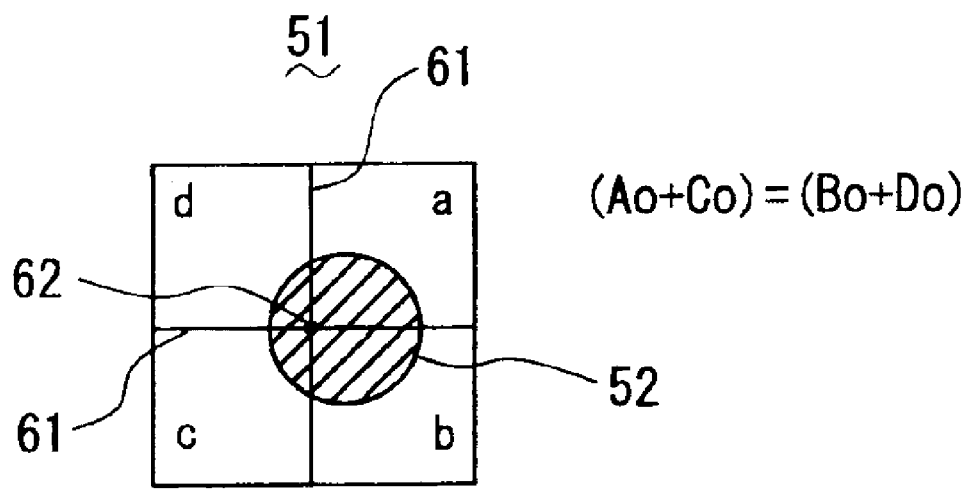
FIG. 7 is a plan view for showing a position of the main beam on the photo-detecting areas when a relation (Ao+Co)=(Bo+Do) is satisfied with respect to the output values Ao, Bo, Co and Do of the photo-detecting signals "A" to "D"

The reason for adjusting the levels of the photo-detecting signals "A" to "D" substantially even by adjusting the gains of the gain adjusting amplifiers 21 in the step S4 is described with reference to FIGS. 6 and 7.

It is assumed that the photo-detector 46 is precisely positioned on the optical pickup 4. When the photo-detecting signals "A" to "D" satisfy the above-mentioned relation of (Ao+Co)=(Bo+Do) in the step S2, a intersection 62 of two partition lines 61 coincides with the center of the main beam 52, as shown in FIG. 6. In such the case, a relation of Ao=Bo=Co=Do is further satisfied among the output values Ao, Bo, Co and Do of the photo-detecting signals "A" to "D".

On the other hand, the photo-detector 46 is mounted on the optical pickup 4 by the automated machine, so that the photo-detector 46 has positioning error, occasionally. Although the photo-detecting signals "A" to "D" satisfy the above-mentioned relation of (Ao+Co)=(Bo+Do) in the step S2, a intersection 62 of two partition lines 61 does not coincide with the center of the main beam 52, as shown in FIG. 7. In the latter case, the values of the photo-detecting signals "A" to "D" detected by the photo-detecting areas 51a to 51d of the photo-detector 46 respectively include error components due to positioning error of the photo-detectors 46, so that the output values Ao, Bo, Co and Do of the photo-detecting signals "A" to "D" are occasionally different from each other. The focusing error signal cannot be produced precisely with using such the photo-detecting signals "A" to "D" levels of which are not even.

Thus, the main processor 10 adjust the gains of the gain adjusting amplifiers 21 for adjusting the levels the photo-detecting signals "A" to "D" substantially even so as to execute the precise focusing servo control.

Figure 5:
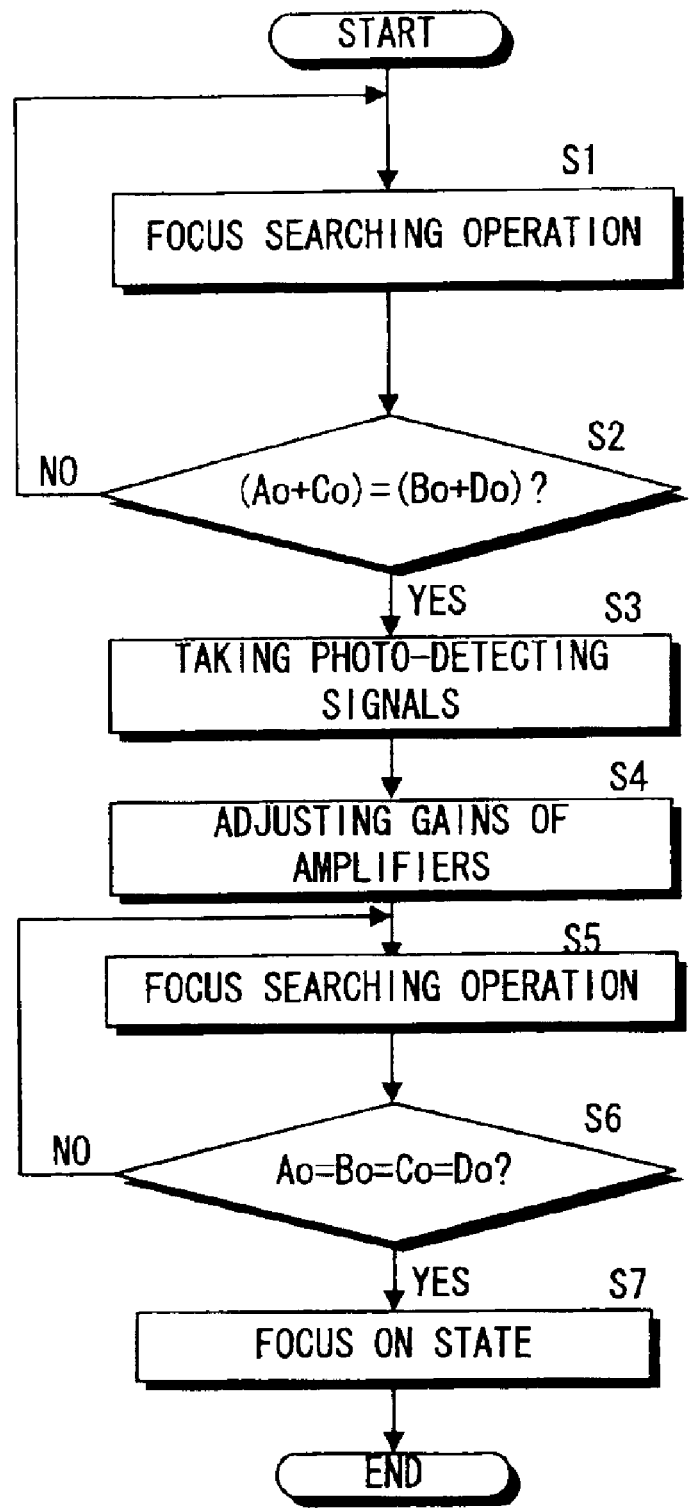
FIG. 5 is a flowchart for showing a level adjusting operation of photo-detecting signals outputted from the photo-detecting areas of the photo-detector when focus searching operation is executed under open-loop state of a focusing servo system in the optical disc apparatus.

When the gain adjusting process of the gain adjusting amplifiers 21 in the step S4 in FIG. 5 is completed, the main processor 10 starts the focus searching operation again for confirming whether the levels of the photo-detecting signals "A" to "D" outputted from the photo-detecting areas 51a to 51d are properly adjusted or not (S5). When the relation of Ao=Bo=Co=Do is satisfied with respect to the output values Ao, Bo, Co and Do of the photo-detecting signals "A" to "D" (YES in S6), the laser beam is just focused on the recording face of the optical disc 2, so that the main processor proceeds to a focused on state (S7).

Figure 8:
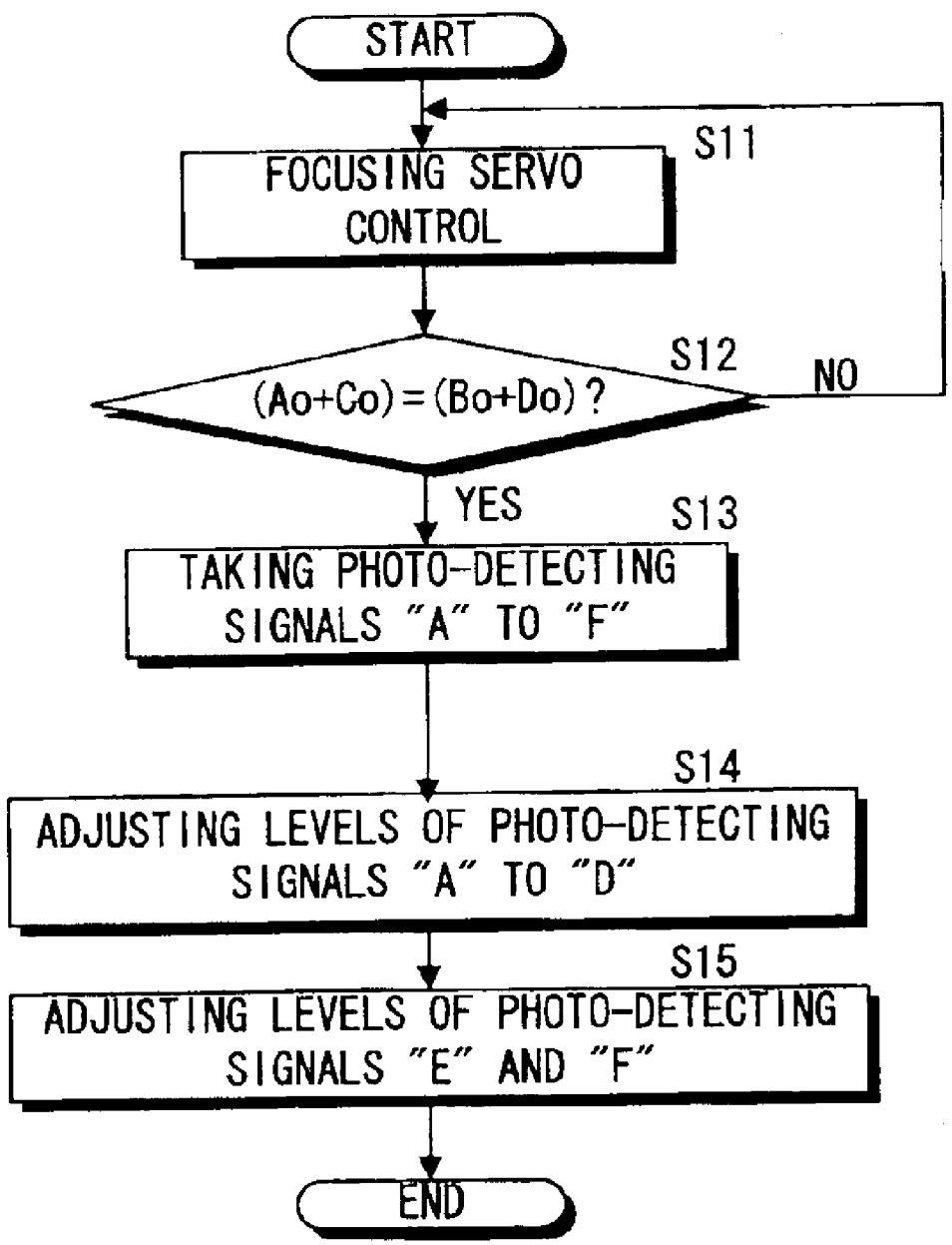
FIG. 8 is a flow chart for showing a level adjusting process of the photo-detecting signals outputted from the photo-detecting areas of the photo-detector when the focusing servo control is executed under close-loop state of the focusing servo system.

Subsequently, the level adjusting process of the photo-detecting signals outputted from the photo-detector 46, when the focusing servo control is executed under close-loop state of the focusing servo system, is described with reference to a flowchart shown in FIG. 8.

When the laser beam is just focused on the recording face of the optical disc 2 in the step S7 in FIG. 5, the main processor 10 executes the focusing servo control for maintaining the focused on state of the laser beam (S11). When the level of the focusing error signal transmitted from the signal processor 7 is "0", that is, when the photo-detecting signals "A" to "D" satisfy the relation of (Ao+Co)=(Bo+Do), the main processor 10 takes the photo-detecting signals "A" to "F" outputted from the photo-detecting areas 51a to 51f of the photo-detector 46 through the wirings 23 (S13). The main processor 10 finely adjusts the gains of the gain adjusting amplifiers 21 in a manner so that all the levels of the photo-detecting signals "A" to "D" become substantially even in a desired range (S14). Subsequently, the main processor 10 adjusts the gains of the gain adjusting amplifiers 21 in a manner so that the levels of the photo-detecting signals "E" and "F" become substantially even (S15). By such a focusing servo control, the levels of the photo-detecting signals "A" to "F" outputted from the photo-detecting areas "A" to "F" of the photo-detector 46 are finely adjusted to be even. Thus, the data recorded on the optical disc 2 can precisely be read out from the optical disc 2, and precisely reproduced on the display apparatus or the like by the decoder 9.

Figure 9:
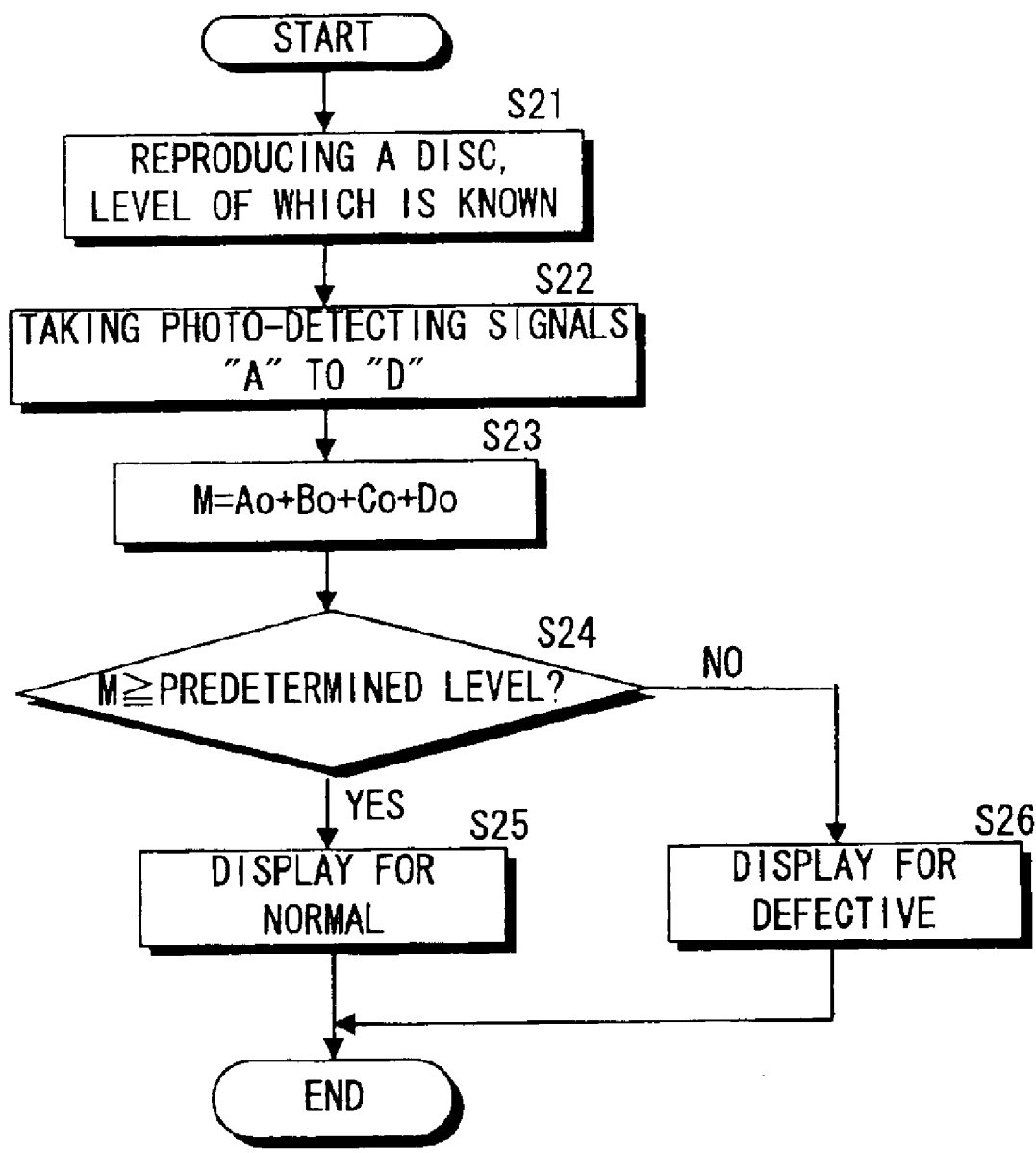
FIG. 9 is a flow chart for showing a malfunction judging process of the optical pickup with using the photo-detecting signals outputted from the photo-detecting areas of the photo-detector.

Subsequently, a method for judging of malfunction of the optical pickup 4 with using the photo-detecting signals "A" to "D" outputted from the photo-detecting areas 51a to 51d of the photo-detector 46 is described with reference to a flowchart shown in FIG. 9.

At the shipment of the optical disc apparatus 1, an optical disc 2, in which levels of the photo-detecting signals are known, is inserted into the optical disc apparatus 1. When an operator operates the remote controller 11 or the like for starting a malfunction judging process, the main processor 10 starts to reproduce data recorded on the optical disc 2 (S21), and takes photo-detecting signals "A" to "D" outputted from the photo-detecting areas 51a to 51d of the photo-detector 46 through the wirings 23 (S22). The main processor 10 calculates a sum "M=Ao+Bo+Co+Do" of the output values Ao, Bo, Co and Do of the photo-detecting signals "A" to "D" (S23), and judges where the value of the sum "M" surpasses a predetermined value or not (S24). When the value of the sum "M" is equal to or larger than the predetermined value (YES in S24), the main processor 10 judges the optical pickup 4 is normally functioned, and displays a message showing the optical pickup 4 is functioned normally on the display 13 (S25). Alternatively, when the value of the sum "M" is smaller than the predetermined value (NO in S24), the main processor 10 judges the optical pickup 4 is not functioned normally, and displays a message showing the optical pickup 4 is defective on the display 13 (S26).

As mentioned above, the optical disc apparatus 1 directly uses the photo-detecting signals "A" to "D" outputted from the photo-detection areas 51a to 51d of the photo-detector 46 for adjusting the gains of the gain adjusting amplifiers 21 in a manner so that the levels of the photo-detecting signals "A" to "D" become substantially even. Thus, the precision of the levels adjustment of the photo-detecting signals "A" to "D" outputted from the photo-detecting areas 51a to 51d of the photo-detector 46 can be increased. Since the S/Ns of the photo-detecting signals "A" to "D" are increased, the RF signal and the focusing error signal can precisely be generated with using the photo-detecting signals "A" to "D". Furthermore, the focusing servo control can be executed precisely responding to the precise focusing error signal. Still furthermore, the video picture and the sound can precisely reproduced with using the precise RF signal.

In the above-mentioned description, the gain adjusting amplifier 21 is configured as an analogous circuit as shown in FIG. 3, and disposed preceding to the A/D converter 22 in the level adjuster 14. It, however, is possible to configure the gain adjusting amplifier 21 as a digital circuit, and to dispose the gain adjusting amplifier 21 following the A/D converter 22. Furthermore, the configuration of the analogous gain adjusting amplifier 21 is not limited by the illustration of FIG. 3. Any circuit configuration, by which the gain of the amplifier can multiply be adjusted, is usable as the gain adjusting amplifier 21.

Still furthermore, in the above-mentioned description, the main photo-detecting unit 51 of the photo-detector 46 is partitioned in four photo-detecting areas 51a to 51d for receiving the main beam 52 in the photo-detector 46. The main photo-detecting unit in the photo-detector 46 is not limited in this example. Any configuration, in which the main photo-detecting unit is partitioned at least in a plurality of photo-detecting areas, can be used for receiving the main beam. Still furthermore, in the above-mentioned description, the photo-detector 46 has two photo-detecting areas 51e and 51f for receiving the sub-beams 53 and 54. It, however, is possible to use a photo-detector with no photo-detecting areas exclusively for detecting the sub-beams.

Still furthermore, the function of the optical disc apparatus 1 is described for reproducing the data recorded on the optical disc 2. It, however, is possible to apply the method for adjusting the levels of the photo-detecting signals outputted from the photo-detecting areas to the function for recording data on an optical disc.

This application is based on Japanese patent application 2003-6060 filed in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An optical disc apparatus comprising:
    an optical pickup having a light source for emitting a light beam to an optical disc and a photo-detector for receiving a reflected beam reflected by the optical disc so as to read data recorded on the optical disc, the photo-detector further having a plurality of partitioned photo-detecting areas;
    a signal processor for generating a readout signal corresponding to the data recorded on the optical disc, a focusing error signal corresponding to discrepancy between a focal point of the light beam and a data recording face of the optical disc, and a tracking error signal corresponding to discrepancy between the focal point of the light beam and a track on the recording face of the optical disc with using the signals outputted from the photo-detector;
    a servo controller for adjusting the focal point of the light beam corresponding to the focusing error signal and the tracking error signal;
    a level adjuster for adjusting levels of photo-detecting signals outputted from the photo-detecting areas of the photo-detector, having a plurality of amplifiers and a plurality of A/D converters connected to the amplifiers for amplifying the photo-detecting signals outputted from respective photo-detecting areas of the photo-detector, so that the signals directly outputted from the level adjuster are digital signals outputted from the A/D converters; and
    a gain adjuster for adjusting gains of the amplifiers with using signals directly outputted from the level adjuster so as to adjust the levels of the photo-detecting signals substantially even.

2. The optical disc apparatus in accordance with claim 1, wherein
    the photo-detector has four partitioned photo-detecting areas which are closely arranged as 2×2 matrix; and
    the signal processor generates the focusing error signals with using adjusted signals corresponding to the photo-detecting signals outputted from the four partitioned photo-detecting areas by a method utilizing astigmatism.

3. The optical disc apparatus in accordance with claim 1, wherein the gain adjuster is a processor for controlling the optical pickup, the signal processor, the servo controller and the level adjuster.

4. The optical disc apparatus in accordance with claim 3, wherein the amplifier is an analogous circuit having a switch for varying the gain in multistage.

5. The optical disc apparatus in accordance with claim 1, wherein the photo-detector has six partitioned photo-detecting areas in which four of the six partitioned photo-detecting areas are closely arranged as 2×2 matrix for receiving a main beam and remained two are positioned both sides of the four partitioned photo-detecting areas in a tangential direction of a track on a recording face of the optical disc for receiving sub-beams; and the signal processor generates the focusing error signals with using adjusted signals corresponding to the photo-detecting signals outputted from the four partitioned photo-detecting areas by a method utilizing astigmatism, and generates the tracking error signals with using adjusted signals corresponding to the photo-detecting signals outputted from the remained two partitioned photo-detecting areas.

6. An optical disc apparatus comprising:

an optical pickup having a laser diode for emitting a laser beam to an optical disc, a photo-detector further having at least four photo-detecting areas closely arranges as 2×2 matrix for receiving a reflected main beam reflected by the optical disc, an objective lens for focusing the laser beam on recording face of the optical disc, a focusing servo mechanism for moving the objective lens in a direction parallel to an optical axis of the objective lens and a tracking servo mechanism for moving the objective lens in a direction parallel to a radial direction of the optical disc;

a signal processor for generating an RF signal corresponding to the data recorded on the optical disc, a focusing error signal corresponding to discrepancy between a focal point of the laser beam and the data recording face of the optical disc with using the photo-detecting signals outputted from the photo-detecting areas by a method utilizing astigmatism, and a tracking error signal corresponding to discrepancy between the focal point of the laser beam and a track on the recording face of the optical disc with using the photo-detecting signals outputted from the photo-detecting areas of the photo-detector;

a servo controller for driving the focusing servo mechanism and the tracking servo mechanism so as to move the objective lens adjusting the focal point of the laser beam corresponding to the focusing error signal and the tracking error signal;

a level adjuster for adjusting levels of photo-detecting signals outputted from the photo-detecting areas of the photo-detector, having a plurality of amplifiers for amplifying the photo-detecting signals and a plurality of A/D converters for converting analogous signals outputted from the amplifiers to digital signals;

a gain adjuster for adjusting gains of the amplifiers with using the digital signals outputted from the A/D converters of the level adjuster so as to adjust the levels of the photo-detecting signals substantially even, while the focusing servo mechanism is driven in open-loop state.

7. The optical disc apparatus in accordance with claim 6, wherein the gain adjuster further adjusts the gains of the amplifiers with using the digital signals outputted from the A/D converters of the level adjuster so as to adjust the levels of the photo-detecting signals substantially even, while the focusing servo mechanism is driven in close-loop state.

8. A method for adjusting levels of photo-detecting signals outputted from a plurality of photo-detecting areas of a photo-detector applied in an optical disc apparatus, comprising the steps for:

setting a focusing servo mechanism of the optical disc apparatus in open-loop state;

driving the focusing servo mechanism for executing a focus searching operation under the open-loop state during which a distance between an objective lens of an optical pickup of the optical disc apparatus and a recording face of an optical disc is varied;

taking analogue photo-detecting signals outputted from a plurality of photo-detecting areas of a photo-detector of the optical disc apparatus while the focus searching operation is executed;

amplifying the analogue photo-detecting signals to digital signals respectively by a plurality of amplifiers converting amplified analogue photo-detecting signals to digital signals by a plurality of A/D converters; and adjusting gains of the amplifiers with using signals directly outputted from the A/D converters so as to adjust the levels of the amplified analogue photo-detecting signals substantially even.

9. The method in accordance with claim 8, wherein the photo-detecting signals are outputted from four photo-detecting areas which are closely arranged as 2×2 matrix; and the focus searching operation is executed with using a method utilizing astigmatism.

* * * * *